United States Patent
Fields

(10) Patent No.: US 8,245,632 B1
(45) Date of Patent: Aug. 21, 2012

(54) EGG BOILING DEVICE

(76) Inventor: Terry Fields, Phoenix, AZ (US)

( * ) Notice: Subject to any disclaimer, the term of this patent is extended or adjusted under 35 U.S.C. 154(b) by 399 days.

(21) Appl. No.: 12/728,197

(22) Filed: Mar. 20, 2010

(51) Int. Cl.
*A47J 27/00* (2006.01)

(52) U.S. Cl. ......................................................... 99/440

(58) Field of Classification Search .................... 99/440, 99/431, 426
See application file for complete search history.

(56) References Cited

U.S. PATENT DOCUMENTS

| | | | |
|---|---|---|---|
| 451,166 A | 4/1891 | Bryant | |
| 745,196 A | 11/1903 | King et al. | |
| 1,184,812 A | 5/1916 | Berger | |
| 1,500,544 A * | 7/1924 | Brockley | 99/440 |
| 1,548,242 A | 8/1925 | Anderson | |
| 1,736,122 A | 11/1929 | La Duke | |
| 1,810,258 A * | 6/1931 | Sperber | 99/342 |
| 4,656,928 A * | 4/1987 | Mack | 99/419 |
| D346,931 S | 5/1994 | Collins | |
| 5,662,027 A * | 9/1997 | Neville et al. | 99/415 |
| 5,934,185 A * | 8/1999 | Sonnier | 99/440 |
| 6,038,966 A * | 3/2000 | Spence | 99/440 |
| 2008/0206437 A1 | 8/2008 | Perry | |

* cited by examiner

*Primary Examiner* — Raleigh W. Chiu
(74) *Attorney, Agent, or Firm* — Kyle Fletcher

(57) ABSTRACT

The egg-boiling device includes a plurality of stackable trays that each contains a plurality of egg cradles. Each egg cradle is capable of supporting an egg in an upright position during the boiling process. Each tray has a handle key way that enables a corresponding handle to engage each tray for movement of the tray into or out of a cooking pot.

20 Claims, 5 Drawing Sheets

EGG BOILING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of cooking devices, more specifically, an egg boiling device that organizes, stacks, and enables eggs to be easily placed or removed from a pot of boiling water.

B. Discussion of the Prior Art

As a preliminary note, it should be stated that there is an ample amount of prior art that deals with egg boiling apparatuses. As will be discussed immediately below, no prior art discloses an egg-boiling device that includes a plurality of stackable trays that each have a plurality of egg cradles for supporting an egg in an upright position, and wherein each tray is maneuvered via a handle that can attach and detach from said tray via a key way on the handle that corresponds to a key way hole on the tray.

The Sonnier Patent (U.S. Pat. No. 5,934,185) discloses a boiling pot egg support system which includes egg supports for holding and supporting each of the eggs to be boiled in a manner to prevent collisions between the eggs. The support includes multiple interconnected egg support structures for stacking. However, the system uses multiple interconnectable egg support structures that have an frame as opposed to a solid disc, and wherein the egg support structures interconnect when stacked.

The Bryant Patent (U.S. Pat. No. 451,166) discloses a stacked egg boiler with a handle for use with a pan of boiling water. However, the stacked egg boiler requires a top portion and a bottom portion to support eggs in a vertical position as opposed to a single tray having egg cradles therein.

The Perry Patent Application Publication (U.S. Pub. No. 2008/0206437) discloses an egg poacher. However, the egg poacher does not disclose a plurality of trays that stack upon one another and of which each support a plurality of eggs in a vertical orientation via a plurality of egg cradles.

The La Duke Patent (U.S. Pat. No. 1,736,122) discloses an egg boiling cup with a tray and handle assembly. However, the cup is not stackable with other cups.

The Anderson Patent (U.S. Pat. No. 1,548,242) discloses a stacked tray egg boiler with a handle. However, the stacked tray requires two trays to support eggs in a vertical orientation and can not include multiple trays each supporting an array of eggs thereon.

The Collins Patent (U.S. Pat. No. Des. 346,931) illustrates a design for an egg cooking rack for a pan, which does not depict a plurality of stackable trays.

The Neville et al. Patent (U.S. Pat. No. 5,662,027) discloses an egg holding cooking utensil having a pair of cylindrical trays. However, the cylindrical trays have sides that encompass or enclose eggs therein, as opposed to flat disks that can each support a plurality of eggs and of which each disk can be stacked onto one another.

The Berger Patent (U.S. Pat. No. 1,184,812) discloses an egg boiler with a timer automatic egg cooker. However, the egg boiler does not have a plurality of trays that can stack upon one another.

The Sperber Patent (U.S. Pat. No. 1,810,258) discloses an egg boiler frame. However, the egg frame does not depict a plurality of egg cradles upon each tray that can support an egg in a vertical orientation, and wherein each tray is not stacked upon one another but is supported on a central pole.

The King Patent (U.S. Pat. No. 745,196) discloses an egg boiler and server. However, the egg boiler does not disclose a plurality of trays that stack upon one another and of which each support a plurality of eggs in a vertical orientation via a plurality of egg cradles.

While the above-described devices fulfill their respective and particular objects and requirements, they do not describe an egg-boiling device that includes a plurality of stackable trays that each have a plurality of egg cradles for supporting an egg in an upright position, and wherein each tray is maneuvered via a handle that can attach and detach from said tray via a key way on the handle that corresponds to a key way hole on the tray. In this regard, the egg-boiling device departs from the conventional concepts and designs of the prior art.

SUMMARY OF THE INVENTION

The egg-boiling device includes a plurality of stackable trays that each contains a plurality of egg cradles. Each egg cradle is capable of supporting an egg in an upright position during the boiling process. Each tray has a handle key way that enables a corresponding handle to engage each tray for movement of the tray into or out of a cooking pot.

It is an object of the invention to provide an egg-boiling device that includes a plurality of stackable trays that can support a plurality of eggs in an upright position.

A further object of the invention is to provide egg cradles upon each tray that support an egg in an upright position, while enabling water to pass through.

A further object of the invention is to provide a handle with a key way, which engages each tray to move said tray.

These together with additional objects, features and advantages of the egg-boiling device will be readily apparent to those of ordinary skill in the art upon reading the following detailed description of presently preferred, but nonetheless illustrative, embodiments of the egg-boiling device when taken in conjunction with the accompanying drawings.

In this respect, before explaining the current embodiments of the egg-boiling device in detail, it is to be understood that the egg-boiling device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the egg-boiling device.

It is therefore important that the claims be regarded as including such equivalent construction insofar as they do not depart from the spirit and scope of the egg-boiling device. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
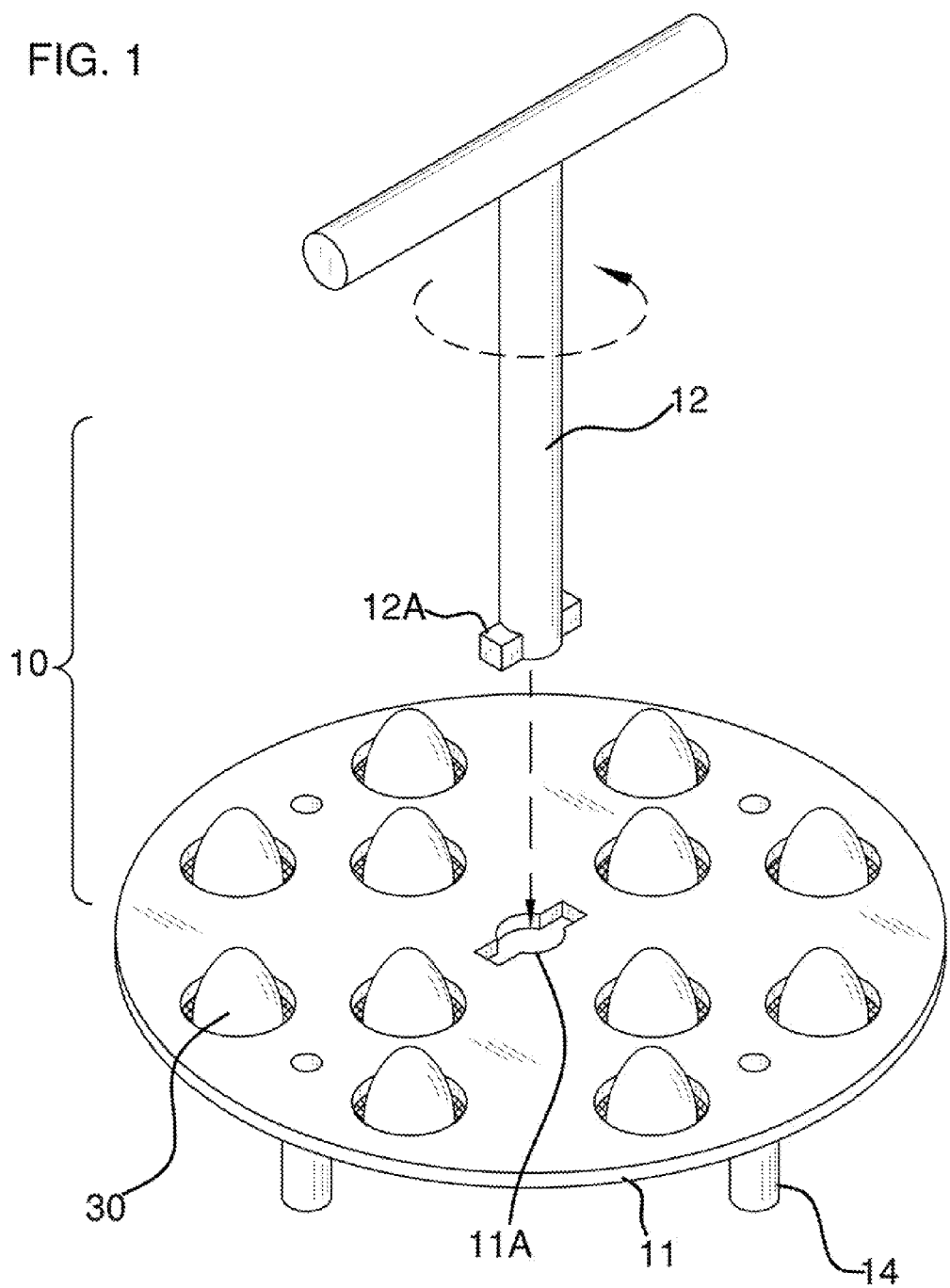
FIG. 1 illustrates a front, isometric view of the egg boiling device by itself with a first tray supporting a plurality of eggs, and wherein the handle is aligned above said first tray with an arrow indicating how the handle is to rotate to engage and lock said first tray.
Figure 2:
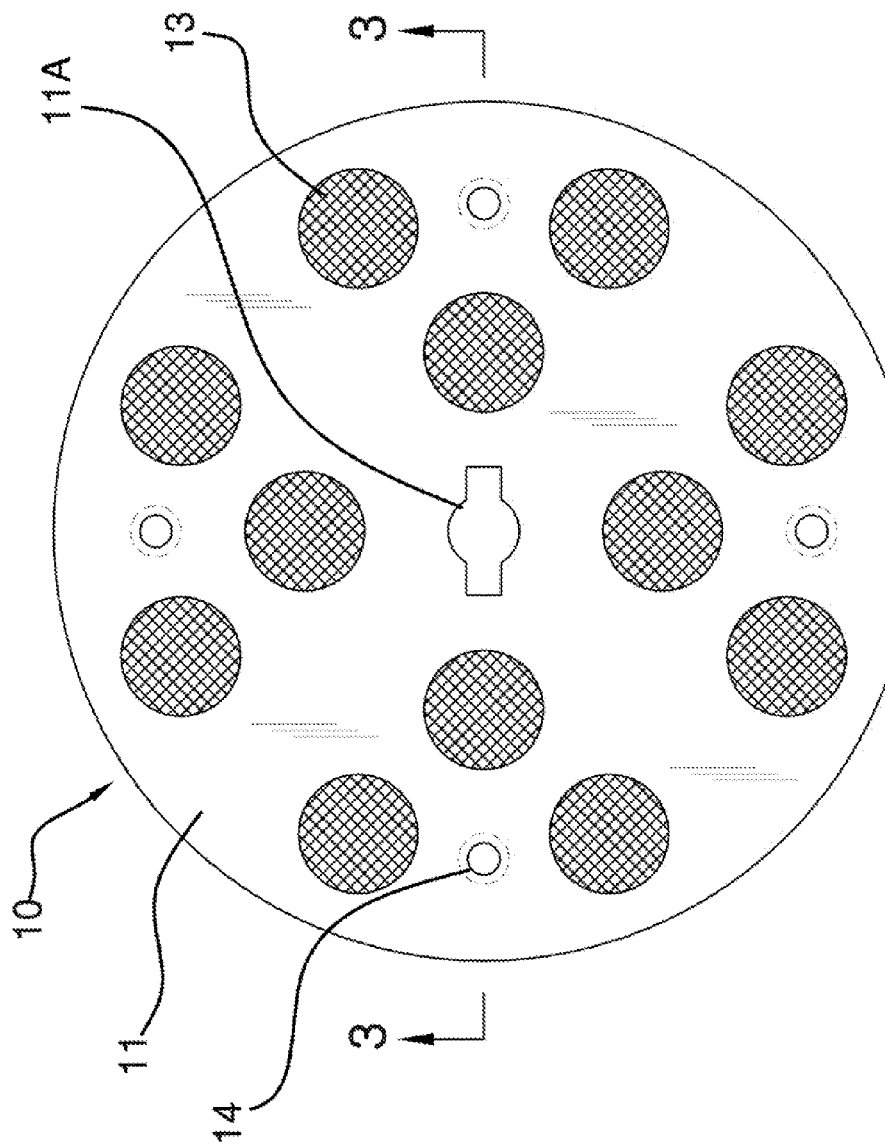
FIG. 2 illustrates a bottom view of the egg boiling device detailing the bottom of the first tray.
Figure 3:
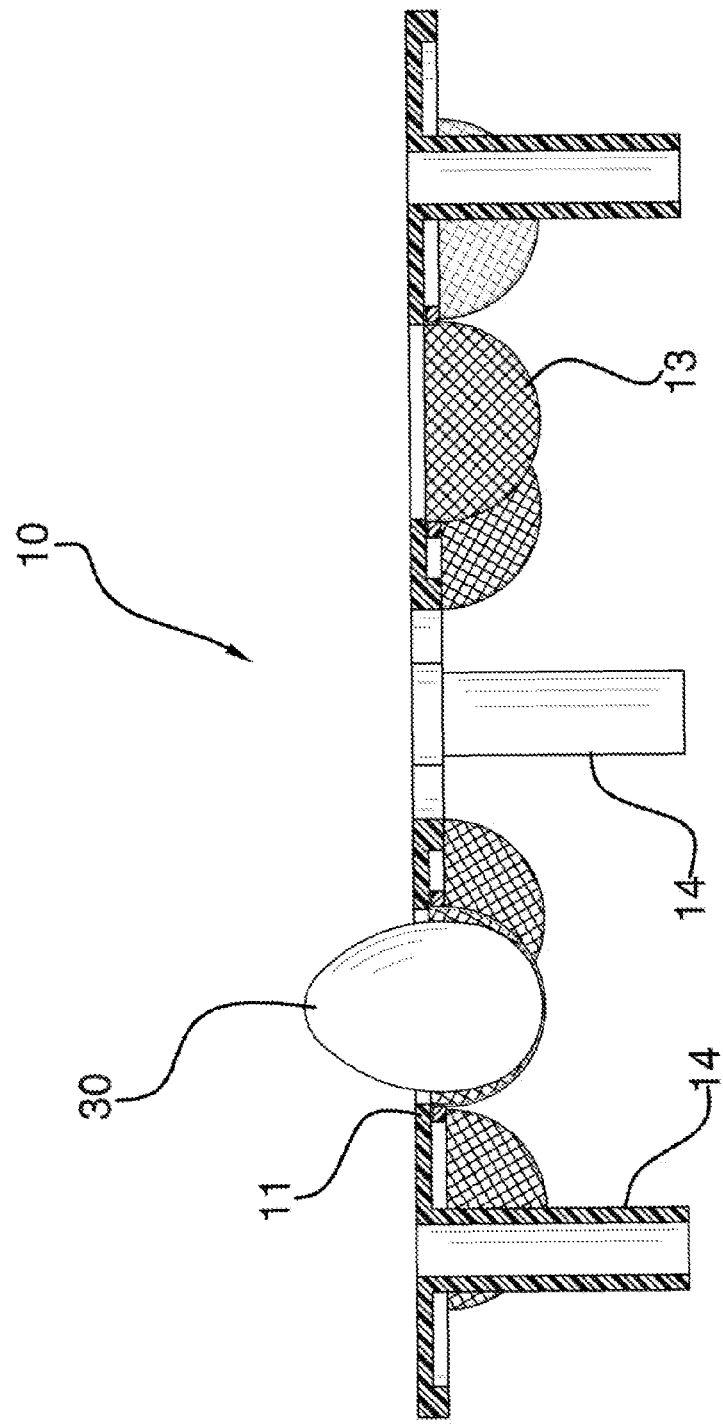
FIG. 3 illustrates a cross-sectional view of the egg boiling device along line 3-3 in FIG. 2, and detailing the inter-relation of the egg and egg cradles of the first tray.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. An egg-boiling device 10 (hereinafter invention) includes at least one tray 11 and a handle 12.

The trays 11 each have a plurality of egg cradles 13 thereon. Each egg cradle 13 is designed to support an individual egg 30. The egg cradles 13 are made of a hemispherical cavity that is secured to the tray 11. Each tray 11 has a plurality of circular openings designed to accommodate the egg cradles 13 therein. The egg cradles 13 have at least one hole, a plurality of holes, or are made of a screen material to enable water to pass through the egg cradle 13 while supporting the egg 30.

The egg cradle 13 is designed to support the egg 30 in an upright position, which is desirable when boiling eggs. It is desirable to hard-boil an egg in an upright position in order to insure that the yoke is more centrally located and uniform within the egg 30. The egg cradles 13 are made of a material comprising a metal, plastic, wood, ceramic, or carbon fiber composite.

The trays 11 are made of a material comprising a metal, plastic, wood, ceramic, or carbon fiber composite. The trays 11 have a thickness ranging from 1/16 inch to 1/2 inch, which insures that the trays 11 are strong enough to support the weight of multiple trays 11 and multiple eggs 30 while also providing a sturdy surface from which to clean the trays 11 between uses.

Figure 4:
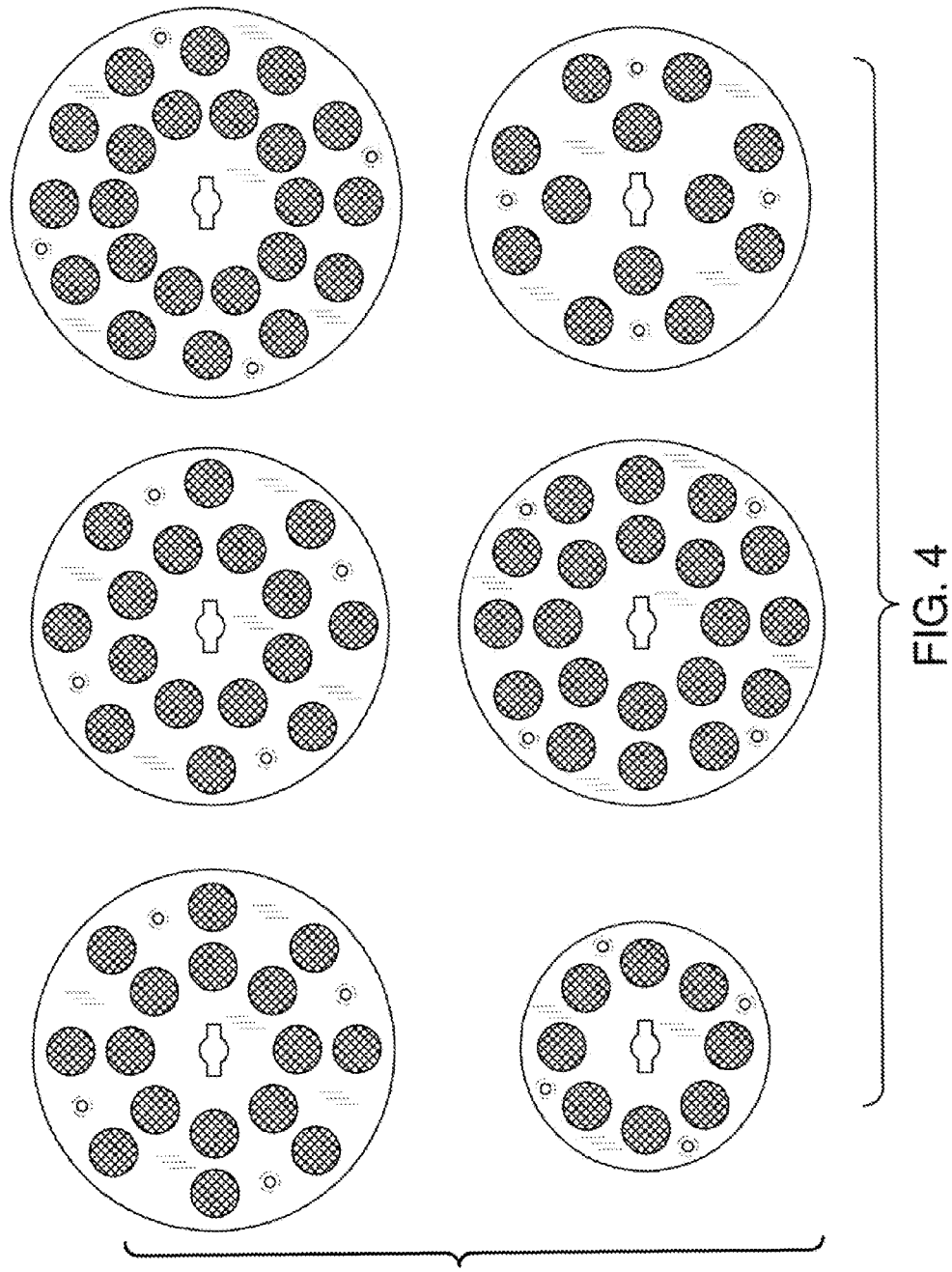
FIG. 4 illustrates a top view of the egg boiling device, and detailing the various egg tray configurations.
Figure 5:
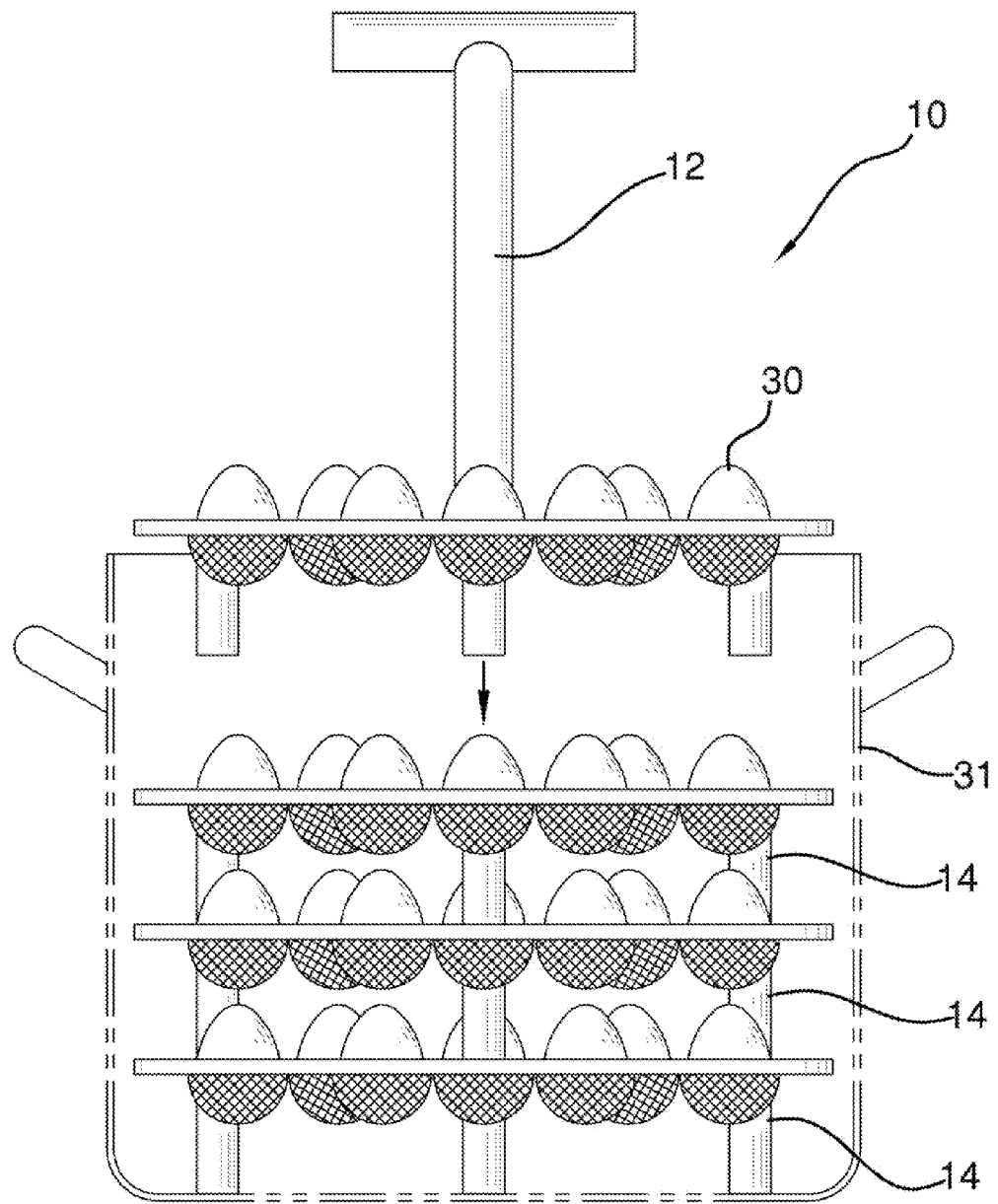
FIG. 5 illustrates a plurality of trays of the egg boiling device stacked within a pot, and further detailing removal of a top stack from said pot via the handle.

The trays 11 may come in a plurality of shapes and sizes. Referring to FIG. 4, the trays 11 may have larger or smaller diameters and thereby larger or smaller numbers of egg cradles 13 therein. It shall be noted that a shape of a cooking pot 31 will dictate the shape of the tray 11 used to boil eggs 30 supported therein. The trays 11 have a shape comprising a circle, oval, square, rectangle, triangle, pentagon, hexagon, or octagon.

Each tray 11 shall have a plurality of legs 14 that extend from a bottom surface of the tray 11. The legs 14 support the tray 11 at a pre-determined elevation above a ground or floor surface. Also, the legs 14 ensure ample clearance between successive trays 11, which insures that the eggs 30 are adequately distanced during use of the invention 10.

The legs 14 shall have an overall length equal to or greater than the overall height of the eggs 30 being cooked via the invention 10. The legs 14 shall be made of a material comprising a wood, plastic, metal, ceramic, or carbon fiber composite. The legs 14 are secured to the tray 11 via securing means comprising adhesive, welding, riveting, screwing, or molding of the parts together.

The handle 12 is of a T-handle ilk, and includes a key way 12A along a bottom end of the handle 12. The trays 11 each have a handle key way 11A about a center of the tray 11, which is used by the handle 12 to secure said handle 12 to said tray 11 in order to remove or place said tray 11 within the cooking pot 31. The key way 12A of the handle 12 fits within the handle key way 11A of the tray 11, and then the handle 12 is rotated to secure the handle 12 to the tray 11. Once the handle 12 is secured to the tray 11, the tray 11 can be transported either into or out of the cooking pot 31.

The inclusion of the key way 12A, the handle 12, and the handle key way 11A of each tray, is a major feature of the invention 10 in that it enables the trays 11 to be stacked upon one another inside of the cooking pot 31, while enabling each tray 11 a means of inserting and removing said tray from the cooking pot 31. The handle 12 is made of a material comprising a wood, plastic, metal, ceramic, or carbon fiber composite.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An egg-boiling device, further comprising:
    at least one tray;
    wherein said tray has a plurality of egg cradles thereon and of which each egg cradle can support an egg in an upright position thereon;
    wherein a plurality of said trays can stack upon one another;
    wherein each of said trays includes a handle key way;
    a handle having a key can be inserted into the handle key way of a top tray, and wherein said handle is rotated to lock said tray thereon, and wherein said handle is used to place and remove said tray from and into a pot for boiling of eggs held upon said tray.

2. The egg-boiling device as described in claim 1 wherein the egg cradles consist of a hemispherical cavity that supports an egg in an upright position.

3. The egg-boiling device as described in claim 2 wherein the egg cradles are made of a material having a plurality of holes or a screen, which enables the egg to be supported in an upright position while enabling water to pass there through.

4. The egg-boiling device as described in claim 1 wherein the egg cradles are made of a material comprising a metal, plastic, wood, ceramic, or carbon fiber composite.

5. The egg-boiling device as described in claim 1 wherein the trays are made of a material comprising a metal, plastic, wood, ceramic, or carbon fiber composite.

6. The egg-boiling device as described in claim 1 wherein the trays have a thickness ranging from 1/16 inch to 1/2 inch.

7. The egg-boiling device as described in claim 6 wherein the trays have a shape comprising a circle, oval, square, rectangle, triangle, pentagon, hexagon, or octagon.

8. The egg-boiling device as described in claim 1 wherein the trays each have a plurality of legs thereon.

9. The egg-boiling device as described in claim 8 wherein the legs each extend from a bottom surface of said trays.

10. The egg-boiling device as described in claim 8 wherein the plurality of trays stack upon one another, and are separated vertically at a pre-determined height, which is dictated by the plurality of legs.

11. The egg-boiling device as described in claim 1 wherein the handle is made of a material comprising a wood, plastic, metal, ceramic, or carbon fiber composite.

12. The egg-boiling device as described in claim 1 wherein the handle key way is located about a center of said tray.

13. An egg-boiling device, further comprising:
a plurality of trays
wherein each tray has a plurality of egg cradles thereon and of which each egg cradle can support an egg in an upright position thereon;
wherein said tray has a circular opening to support said egg cradle thereon;
wherein each tray has a plurality of legs extending from a bottom surface;
wherein a plurality of said trays can stack upon one another;
wherein each of said trays includes a handle key way that is located at a center of said tray;
a handle having a key can be inserted into the handle key way of a top tray, and wherein said handle is rotated to lock said tray thereon, and wherein said handle is used to place and remove said tray from and into a pot for boiling of eggs held upon said tray.

14. The egg-boiling device as described in claim 13 wherein the egg cradles consist of a hemispherical cavity that supports an egg in an upright position.

15. The egg-boiling device as described in claim 14 wherein the egg cradles are made of a material having a plurality of holes or a screen, which enables the egg to be supported in an upright position while enabling water to pass there through.

16. The egg-boiling device as described in claim 13 wherein the egg cradles are made of a material comprising a metal, plastic, wood, ceramic, or carbon fiber composite.

17. The egg-boiling device as described in claim 13 wherein the trays are made of a material comprising a metal, plastic, wood, ceramic, or carbon fiber composite.

18. The egg-boiling device as described in claim 13 wherein the trays have a thickness ranging from 1/16 inch to 1/2 inch.

19. The egg-boiling device as described in claim 18 wherein the trays have a shape comprising a circle, oval, square, rectangle, triangle, pentagon, hexagon, or octagon.

20. The egg-boiling device as described in claim 13 wherein the handle is made of a material comprising a wood, plastic, metal, ceramic, or carbon fiber composite.

* * * * *